United States Patent
Gormley

(10) Patent No.: US 9,103,298 B2
(45) Date of Patent: Aug. 11, 2015

(54) SEAL FOR A VARIABLE AREA FAN NOZZLE

(75) Inventor: Timothy Kent Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 895 days.

(21) Appl. No.: 13/340,125

(22) Filed: Dec. 29, 2011

(65) Prior Publication Data

US 2013/0167505 A1 Jul. 4, 2013

(51) Int. Cl.
*F02K 1/09* (2006.01)
*F02K 1/80* (2006.01)
*F02C 7/28* (2006.01)

(52) U.S. Cl.
CPC ... *F02K 1/09* (2013.01); *F02C 7/28* (2013.01); *F02K 1/805* (2013.01); *F05D 2240/55* (2013.01); *Y02T 50/672* (2013.01)

(58) Field of Classification Search
CPC ......... F02C 7/28; F05D 2240/55; F02K 1/09; F02K 1/1238; F02K 1/1246; F02K 1/1253; F02K 1/1261; F02K 1/1276; F02K 1/1284; F02K 1/72; F02K 1/805
See application file for complete search history.

(56) References Cited

U.S. PATENT DOCUMENTS

2010/0212286 A1* 8/2010 West et al. .................. 60/226.2
2011/0174899 A1* 7/2011 Vauchel ................... 239/265.11

* cited by examiner

*Primary Examiner* — Andrew Nguyen
(74) *Attorney, Agent, or Firm* — O'Shea Getz P.C.

(57) ABSTRACT

A primary seal assembly for a variable area fan nozzle (VAFN) equipped turbofan engine includes a deformable seal and a seal retainer attached to the seal. The seal includes an inner wall and webs attached to the inner wall and extending transversely there-from. The inner wall and the webs extend circumferentially at least partially around a bypass duct of the turbofan engine. An inner surface of the inner wall interfaces with the VAFN when the VAFN is in the stowed position. The seal is compressed between the VAFN and the seal retainer when the VAFN is in the stowed position. And each of the webs is deformed into a non-planar configuration when the VAFN is in the stowed position.

20 Claims, 13 Drawing Sheets

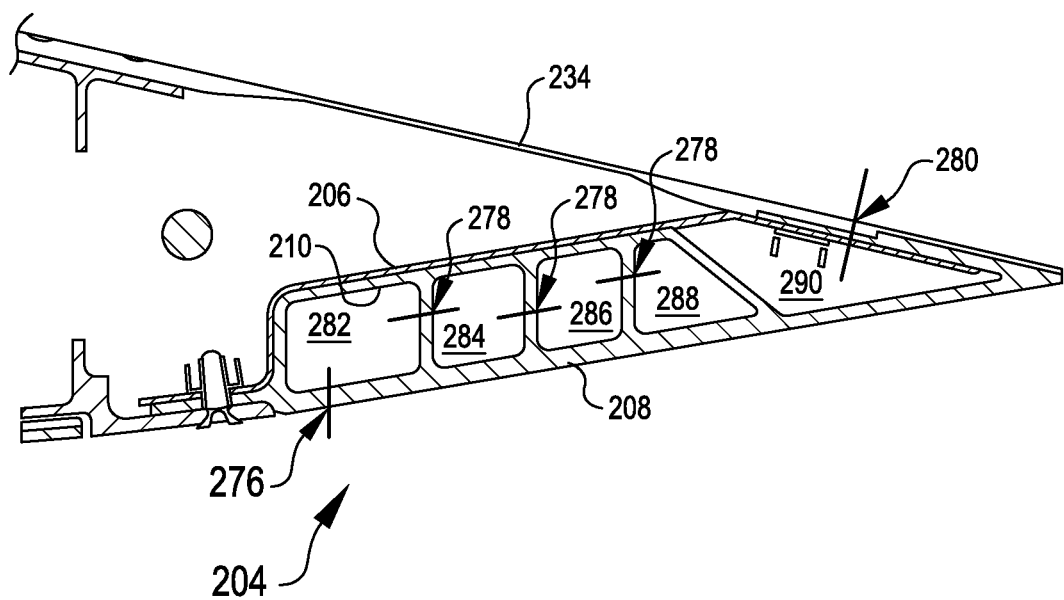

SEAL FOR A VARIABLE AREA FAN NOZZLE

BACKGROUND

Typical aircraft turbofan jet engines include an engine core, a nacelle that surrounds the engine core, and a fan that draws in a flow of air that is split into bypass airflow and engine core airflow. The nacelle provides a bypass duct that surrounds the engine core. The bypass airflow is transported through the bypass duct. The nacelle is configured to promote laminar flow of air through the bypass duct. The engine core includes a multi-stage compressor to compress the engine core airflow, a combustor to add thermal energy to the compressed engine core airflow, and a turbine section downstream of the combustor to produce mechanical power from the engine core airflow. The typical turbine section has two and sometimes three turbine stages. The turbine stages are used to drive the compressor and the fan. After exiting from the turbine section, the engine core airflow exits through an exhaust nozzle at the aft end of the engine.

In a turbofan engine, the fan typically produces a majority of the thrust produced by the engine. The bypass airflow can be used to produce reverse thrust typically used during landing. Thrust reversers mounted in the nacelle selectively reverse the direction of the bypass airflow to generate reverse thrust. During normal engine operation, the bypass airflow may or may not be mixed with the exhausted engine core airflow prior to exiting the engine assembly.

Several turbofan engine parameters have a significant impact upon engine performance. Bypass ratio (BPR) is the ratio of the bypass airflow rate to the engine core airflow rate. A high BPR engine (e.g., BPR of 5 or more) typically has better specific fuel consumption (SFC) and is typically quieter than a low BPR engine of equal thrust. In general, a higher BPR results in lower average exhaust velocities and less jet noise at a specific thrust. A turbofan engine's performance is also affected by the engine's fan pressure ratio (FPR). FPR is the ratio of the air pressure at the engine's fan nozzle exit to the pressure of the air entering the fan. A lower FPR results in lower exhaust velocity and higher propulsive efficiency. Reducing an engine's FPR can reach a practical limit, however, as a low FPR may not generate sufficient thrust and may cause engine fan stall, blade flutter, and/or compressor surge under certain operating conditions.

One approach for optimizing the performance of an engine over various flight conditions involves varying the fan nozzle exit area. By selectively varying the fan nozzle's exit area, an engine's bypass flow characteristics can be adjusted to better match a particular flight condition, for example, by optimizing the FPR relative to the particular thrust level being employed. For example, a variable area fan nozzle (VAFN) that forms a rear outer portion of the bypass duct can be moved aft so as to open an additional bypass flow exit forward of the VAFN. The VAFN can be selectively positioned anywhere between a stowed position in which no additional bypass exit is formed and a fully deployed position in which the additional bypass exit is open to a maximum extent.

Integrating a VAFN into an engine nacelle, however, presents challenges that arise from conflicting goals. In the stowed position, it is preferable that the VAFN interfaces with the rest of the nacelle such that the additional bypass exit is closed and sealed without inducing high stowing related loads in actuators used to position the VAFN. Accordingly, to meet stowed position sealing goals, it is desirable to have interfacing components with low stiffness. In the deployed position, however, it is preferable that the resulting additional bypass exit has desirable aerodynamic characteristics, such as low drag. Accordingly, to meet deployed position aerodynamic goals, it is desirable that the foregoing interfacing components be sufficiently stiff to avoid undesirable deflections, which can cause aerodynamic drag.

Accordingly, improved interfacing components for a VAFN are desired, such as a primary seal assembly having good stowed and deployed position characteristics.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Primary seal assemblies for variable area fan nozzle (VAFN) equipped turbofan engines are disclosed. And turbofan engines equipped with a VAFN and associated VAFN primary seal assembly are disclosed. The disclosed primary seal assemblies employ a seal having webs that are deformable into a non-planar configuration when the VAFN is in the stowed configuration, thereby providing stowed position sealing without inducing large actuator stowing loads. The seal is also configured to avoid excessive deployed position deflections, thereby avoiding associated increases in aerodynamic drag. And a lightweight seal retainer is disclosed that, when attached to the nacelle assembly forward of the VAFN, positions the seal accurately and reacts loads from the seal to the nacelle forward assembly. In addition to having good durability, the disclosed seal assemblies are easily removed and replaced if necessary.

Thus, in one aspect, a nacelle is provided for a turbofan engine having an engine centerline. The nacelle includes a forward assembly, a variable area fan nozzle (VAFN) disposed behind the forward assembly, and a seal attached to the forward assembly. The forward assembly defined a bypass duct that extends circumferentially at least partially around the engine centerline. The bypass duct is configured to transport bypass airflow of the engine. The forward assembly has an aft edge that extends circumferentially at least partially around the bypass duct. The VAFN is movable relative to the forward assembly between a stowed position and a deployed position. An upstream bypass flow exit for the bypass duct is defined between the forward assembly and the VAFN when the VAFN is in the deployed position. An outer surface of the VAFN provides an aerodynamic boundary for bypass airflow exited through the bypass flow exit. The seal includes an inner wall and a plurality of webs attached to the inner wall and extending transversely there-from. Each of the webs extends circumferentially at least partially around the bypass duct. The inner wall defines an exposed inner surface that extends circumferentially at least partially around the bypass duct. The inner surface provides a substantially smooth aerodynamic boundary for bypass airflow exited through the bypass flow exit when the VAFN is in the deployed position. At least a portion of the inner surface interfaces with the VAFN outer surface when the VAFN is in the stowed position so as to seal the bypass flow exit. Each of the webs has a non-planar configuration when the VAFN is in the stowed position.

The seal can be configured to circumferentially extend around the engine centerline to a significant extent. For example, the seal can extend circumferentially around the engine centerline for at least 90 degrees.

The seal can be adapted in accordance with the geometry of the forward assembly and the VAFN. For example, a height of the seal can be tapered down near an end of the seal.

The nacelle can include additional seals suitable for the geometry of the forward assembly and the VAFN. For example, the nacelle can further include a bulb seal attached to the forward assembly and disposed near the end of the seal. The bulb seal is compressed between the forward assembly and the VAFN when the VAFN is in the stowed position.

In many embodiments, each of the webs has a planar configuration when the VAFN is in the deployed position. The planar web configuration serves to provide solid support for the inner wall so that the inner wall deflections are minimized, and in any event are acceptable from an aerodynamic perspective.

In many embodiments, the seal includes an elastomeric material. For example, the elastomeric material can include any suitable resiliently deformable material, such as silicon rubber.

The seal can include any suitable number of webs. And any suitable subset of the webs can be configured to be resiliently deformed into a non-planar configuration when the VAFN is in the stowed position. For example, the plurality of webs can include three webs. Any suitable subset of the three webs (e.g., one, two, three) can be resiliently deformed into a non-planar configuration when the VAFN is in the stowed position. And any suitable subset of the three webs (e.g., one, two, three) can have a planar configuration when the VAFN is in the deployed position. As another example, the plurality of webs can include four webs. Any suitable subset of the four webs (e.g., one, two, three, four) can be resiliently deformed into a non-planar configuration when the VAFN is in the stowed position. And any suitable subset of the four webs (e.g., one, two, three, four) can have a planar configuration when the VAFN is in the deployed position.

In many embodiments, the nacelle further includes a seal retainer that defines a seal receiving cavity for the seal. The seal receiving cavity has an arcuate shape extending circumferentially at least partially around the bypass duct. The seal retainer includes a retainer forward flange, a retainer aft flange, and a retainer middle portion extending between the retainer forward and aft flanges. Each of the retainer forward and aft flanges extends circumferentially at least partially around the bypass duct and is attached to the nacelle forward assembly. The seal is located between the VAFN and the retainer middle portion when the VAFN is in the stowed position. The seal can include a seal forward flange that extends circumferentially at least partially around the bypass duct and a seal aft flange that extends circumferentially at least partially around the bypass duct. The seal forward flange can be disposed between the retainer forward flange and the forward assembly. And the seal aft flange can be disposed between the retainer aft flange and the forward assembly. At least one of the seal forward flange or the seal aft flange can include an embedded layer to serve as an internal reinforcement with respect to attachment fastener load transfer.

In many embodiments, the seal includes an outer wall offset from the inner wall and attached to the webs so that a plurality of enclosed cell areas is defined within the seal. The enclosed cell areas extend circumferentially at least partially around the bypass duct. The outer wall can be attached to any suitable support, such as the retainer middle portion or a support provided by the nacelle forward assembly. For example, the outer wall can be bonded to the retainer middle portion.

In many embodiments, the seal includes vent ports, which can be used to selectively distribute applied pressure within the seal. For example, the inner wall can include a vent port in communication with a first enclosed cell of the enclosed cell areas. And one of the webs can include a vent port in communication with the first enclosed cell area and a second enclosed cell area of the enclosed cell areas, the first and second enclosed cell areas being different.

In many embodiments, the outer wall includes a plurality of recesses extending circumferentially at least partially around the bypass duct. The recesses are configured to accommodate adhesive used to bond the outer wall to a support, such as adhesive used to bond the outer wall to the retainer. The recesses are disposed between non-recessed areas that are substantially aligned with the webs. The non-recessed areas substantially interface with the support, for example, with the retainer middle portion.

In many embodiments, the seal includes a plurality of elongate pull-through features that extend from the outer wall through holes in the retainer middle portion. The pull-through features interface with the holes in the retainer middle portion to position the outer wall relative to the retainer middle portion.

In many embodiments, the inner wall includes an embedded reinforcement layer. The inner wall reinforcement layer increases the stiffness of the inner wall, thereby serving to reduce aerodynamic induced deflections and associated drag when the VAFN is in the deployed position. The embedded reinforcement layer can have a plurality of reduced-stiffness sections distributed circumferentially at least partially around the engine centerline to reduce stiffness of the reinforcement layer circumferential to the engine centerline.

In another aspect, a seal assembly is disclosed for a turbofan engine having a VAFN. The engine includes a forward assembly and the VAFN disposed behind the forward assembly and movable relative to the forward assembly between a stowed position and a deployed position. The forward assembly defines a bypass duct extending circumferentially at least partially around the engine centerline. The bypass duct is configured to transport bypass airflow of the engine. The forward assembly has an aft edge that extends circumferentially at least partially around the bypass duct. An upstream bypass flow exit for the bypass duct is defined between the forward assembly and the VAFN when the VAFN is in the deployed position. An outer surface of the VAFN provides an aerodynamic boundary for bypass airflow exited through the bypass flow exit. The seal assembly includes a seal and a seal retainer attached to the seal. The seal includes an inner wall and a plurality of webs attached to the inner wall and extending transversely there-from. Each of at least two of the webs is configured to extend circumferentially at least partially around the bypass duct. The inner wall defines an exposed inner surface configured to extend circumferentially at least partially around the bypass duct. The inner surface is configured to provide a substantially smooth aerodynamic boundary for bypass airflow exited through the bypass flow exit when the VAFN is in the deployed position. At least a portion of the inner surface is configured to interface with the VAFN outer surface when the VAFN is in the stowed position so as to seal the bypass flow exit. Each of at least two of the webs is configured to deform into a non-planar configuration when the VAFN is in the stowed position. The seal retainer defines a seal receiving cavity for the seal. The seal receiving cavity has an arcuate shape configured to extend circumferentially at least partially around the bypass duct. The seal retainer includes a retainer forward flange, a retainer aft flange, and a retainer middle portion extending between the retainer forward and aft flanges. Each of the retainer forward and aft flanges is configured to extend circumferentially at least partially around the bypass duct and be attached to the forward assembly. The seal is configured to be compressed between the VAFN and the retainer middle portion when the VAFN is in the stowed position.

For a fuller understanding of the nature and advantages of the present invention, reference should be made to the ensuing detailed description and accompanying drawings.

BRIEF DESCRIPTION OF THE DRAWINGS

FIG. 17 is a cross-sectional view illustrating the location of vent ports in a VAFN main seal, in accordance with many embodiments.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention can be practiced without the specific details. Furthermore, well-known features may be omitted or simplified in order not to obscure the embodiment being described.

Figure 1:
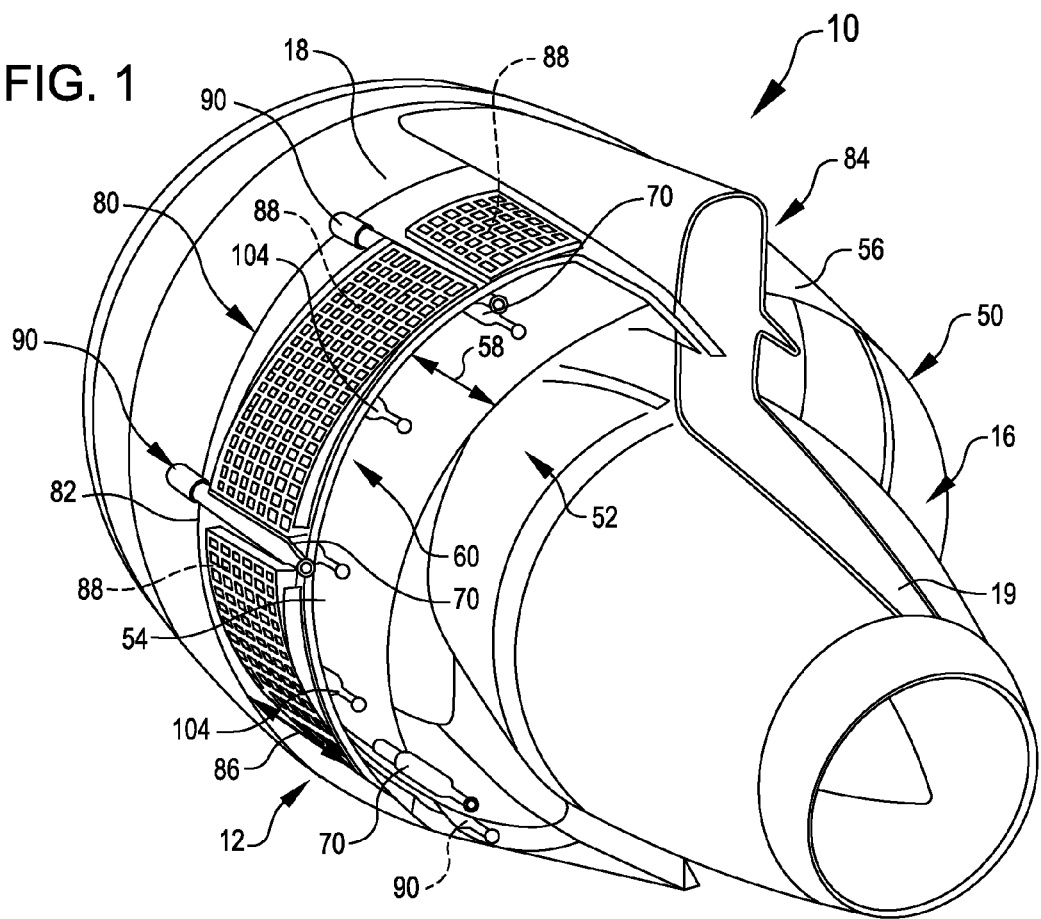
FIG. 1 is a perspective view illustration of a turbofan engine that includes a variable area fan nozzle (VAFN) assembly, in accordance with many embodiments.
Figure 2:
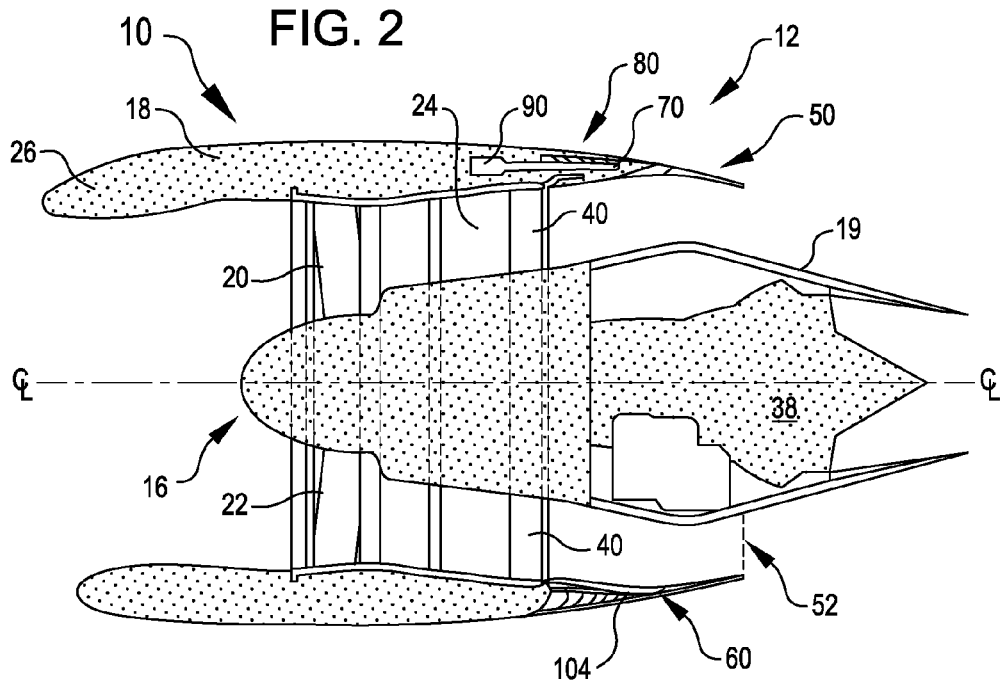
FIG. 2 is a cross-sectional view of the turbofan engine of FIG. 1.

Referring now to the drawings, in which like reference numerals represent like parts throughout the several views, FIG. 1 shows a turbofan engine 10 that includes a variable area fan nozzle (VAFN) assembly 12 having a translating fan nozzle 50 that can be selectively adjusted, for example, as the engine 10 operates under different flight conditions. As discussed above, such an adjustment can be used to optimize the engine's performance. As shown in FIG. 2, the translating fan nozzle 50 can be selectively translated (i.e., moved fore and aft) to vary the fan nozzle's exit area 52 and to adjust how much of the bypass airflow exits through an upstream exit 60 formed by the VAFN assembly 12. For example, when the translating fan nozzle 50 is in the stowed position, the upstream exit 60 is closed and the exit area 52 is minimized, thereby maximizing the fan pressure ratio (FPR) for a particular operational condition. And when the translating fan nozzle 50 is in the fully deployed position, the upstream exit 60 opening is maximized and the exit area 52 is maximized, thereby minimizing the FPR for the particular operational condition. Accordingly, selectively positioning the translating fan nozzle 50 can be used to selectively vary the FPR. And varying the FPR can be used to optimize engine performance, increase fan stall margins, avoid engine malfunction, and/or avoid engine shutdown. For purposes of illustration, the VAFN assembly 12 is shown in the context of a turbofan aircraft engine 10. The engine 10 can be mounted to a wing or fuselage of an aircraft, for example, by a pylon or other similar support (not shown in the figures).

The engine 10 includes an engine core 16 and a nacelle 18. The engine core 16 is housed in a core cowl 19. As shown in FIG. 2, a fan 20 is mounted adjacent to an upstream end of the nacelle 18, and includes a series of fan blades 22 that are rotated about the engine centerline CL during engine operation so as to draw a flow of air into an inlet end 26 of the engine 10. An annular bypass duct 24 is defined between the engine core 16 and the nacelle 18. The airflow drawn into the engine 10 is accelerated by the rotating fan blades 22. A portion of the airflow is directed into and through a multi-stage compressor (not illustrated) within the engine core 16. The engine core airflow through the engine core 16 is initially passed through the compressor to increase the airflow pressure, after which the pressurized air is passed through a combustor (not shown), where it is mixed with fuel and the mixture ignited. The combustion of the fuel and air mixture within the combustor causes the air to expand, which in turn drives a series of turbines at the rear of the engine, indicated generally at 38, to rotate and in turn to provide power to the fan 20.

The bypass airflow accelerated by the rotating fan blades 22 passes through the bypass duct 24, past stators 40, and out through the nozzle assembly 12. The fan 20 produces most of the engine thrust. The high pressure heated exhaust gases from the combustion of the fuel and air mixture are directed out of the rear of the engine core 16 downstream of the turbine section 38.

Figure 3:
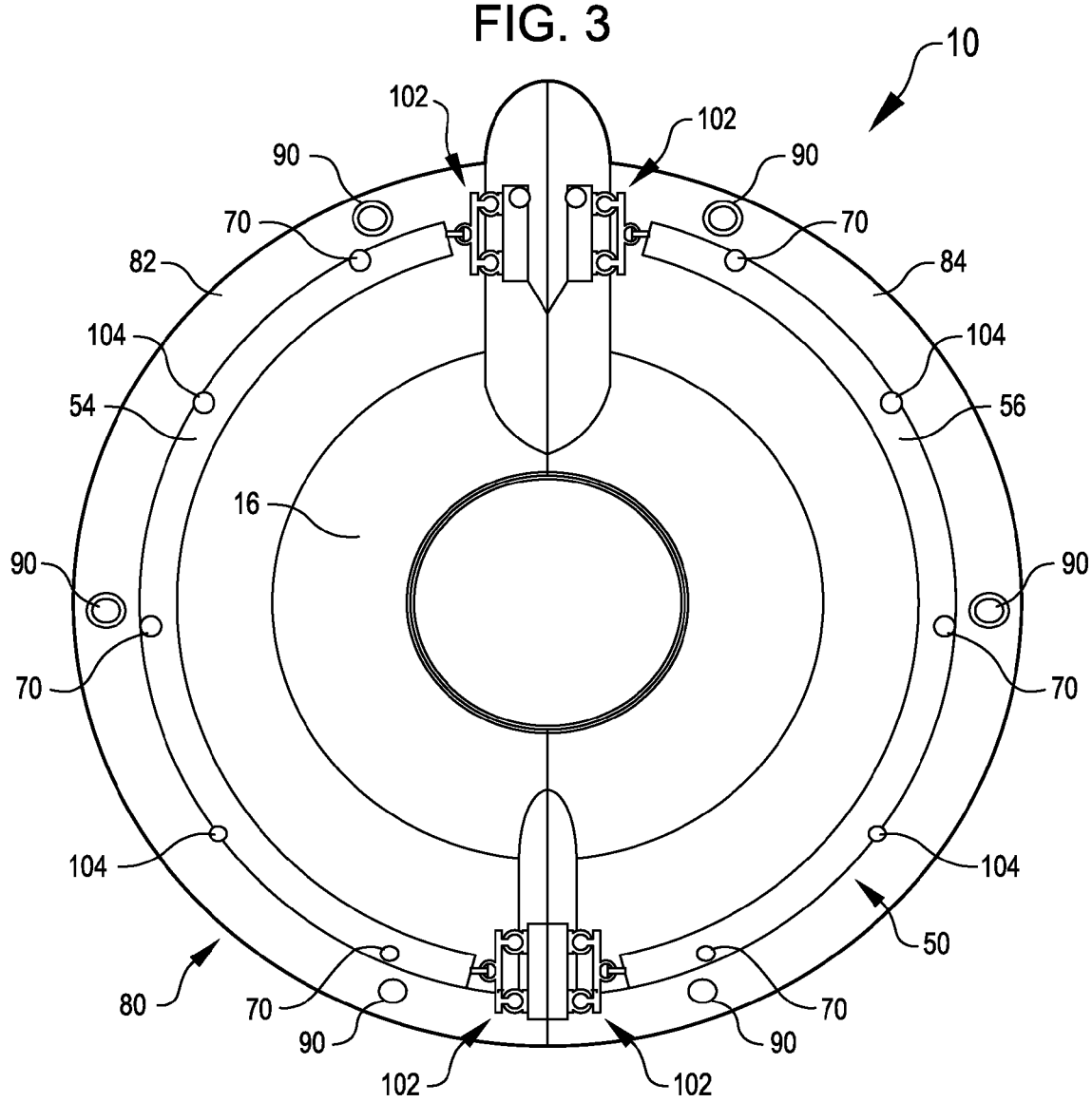
FIG. 3 is an end view of the turbofan engine of FIG. 1.

The translating fan nozzle 50 can include a ring-like annular airfoil structure mounted at the trailing end of a thrust reverser 80, adjacent to and circumscribing at least a portion of the engine core cowl 19. The area between the trailing edge of the translating fan nozzle 50 and the core cowl 19 defines the nozzle exit area 52 for the translating fan nozzle 12. As shown in FIG. 1 and FIG. 3, the translating fan nozzle 50 includes an arcuate first ring section 54 and an arcuate second ring section 56. Each ring section 54, 56 is axially translatable in the direction of the bidirectional arrow 58. Translation of the fan nozzle 50 effects a desired size of the upstream exit 60 and varies the outlet geometry and exit area 52 of the fan nozzle 12 outlet for the engine bypass airflow. The fan nozzle 50 can be translated, for example, by a plurality of ring actuators 70.

The thrust reverser 80 is adjacent to and forward of the translating fan nozzle 50 to block and redirect the bypass airflow in the bypass duct 24 into a thrust reversing vector. In FIG. 1, the thrust reverser 80 and the translating fan nozzle 50 are in stowed (closed) positions. The thrust reverser 80 includes an arcuate first sleeve (cowl) section 82 and an opposed arcuate second sleeve (cowl) section 84 (shown in FIG. 3). The thrust reverser sleeve sections 82, 84 are axially translatable in the direction of the bidirectional arrow 86 by a plurality of sleeve actuators 90. The thrust reverser sleeve sections 82, 84 are translatable over a series of cascade vanes 88. The cascade vanes 88 are indicated by dashed lead lines in FIG. 1 because they are not visible when the thrust reverser 80 is in the stowed position. Axial translation of the sleeve sections 82, 84 in the fore and aft directions allows the bypass airflow to be passed through the cascade vanes 88 to generate a thrust-reversing vector.

FIG. 3 is a cross-sectional view of the aft end of the engine 10, and illustrates the arrangement of the ring and sleeve actuators 70, 90, respectively, around the periphery of the engine 10. As shown in FIG. 1, and more clearly in FIG. 3, the sleeve half section 82 and the ring section 54 cooperate to generally define an approximately 180 degree sector of the combined thrust reverser and translating fan nozzle. Likewise, sleeve half section 84 and ring half section 56 cooperate to generally define an opposed approximately 180 degree sector of the thrust reverser and translating fan nozzle. Together, these approximate 180 degree sectors cooperate to define the entire approximate 360 degree thrust reverser and translating fan nozzle.

As shown in FIGS. 1-3, each thrust reverser sleeve half-section 82, 84 of the thrust reverser 80 is translated by one or more (three are shown) peripherally-spaced sleeve actuators 90 fixedly mounted in the nacelle 18. In the embodiment shown, three actuators 90 are used for each sleeve half-section 82, 84. Each ring section 54, 56 of the translating fan nozzle 50 similarly is translated by one or more (three are shown) peripherally-spaced ring actuators 70. Ring actuators 70 can be mounted on an adjacent thrust reverser sleeve section 82, 84, respectively. The ring actuators 70 can be powered by, for example, electricity, mechanical means, pneumatics, hydraulics, or other suitable means, with appropriate power cables and conduits (not shown) passing via pre-defined passages between or above the thrust reverser cascade boxes or pivot doors. The number and arrangement of ring and sleeve actuators 70, 90 can be varied, for example, according to the thrust reverser and translating fan nozzle configuration, and according to other factors. The ring sections 54, 56 may be mounted in, for example, upper and lower guide structures 102 located at each end of corresponding sleeve sections 82, 84, respectively. Guide tubes 104 may be mounted in the nacelle 18 and may extend into the ring sections 54, 56 to stabilize the ring sections 54, 56 against undesirable translation and/or vibration. Guide tubes can alternatively be mounted in the thrust reverser 80.

The translating fan nozzle 50 can be a continuous (e.g., one-piece) or, as shown in FIG. 3, a continuing (e.g., split or multi-section) generally annular ring having an airfoil cross section. Accordingly, the upstream exit 60 (formed when the translating fan nozzle 50 moves in the aft direction away from the sleeve sections 82, 84) can have the form of a generally annular gap extending around the perimeter of the rear of the nacelle 18. Other outlet shapes can also be used, for example, oval, etc. The generally annular gap between the ring sections 54, 56 and the sleeve sections 82, 84 can be continuous, for example, or interrupted at one or more locations, such as, for example, at points of bifurcation or other separation of the translating fan nozzle 50. The bypass duct 24 may also be interrupted at one or more locations.

Figure 4:
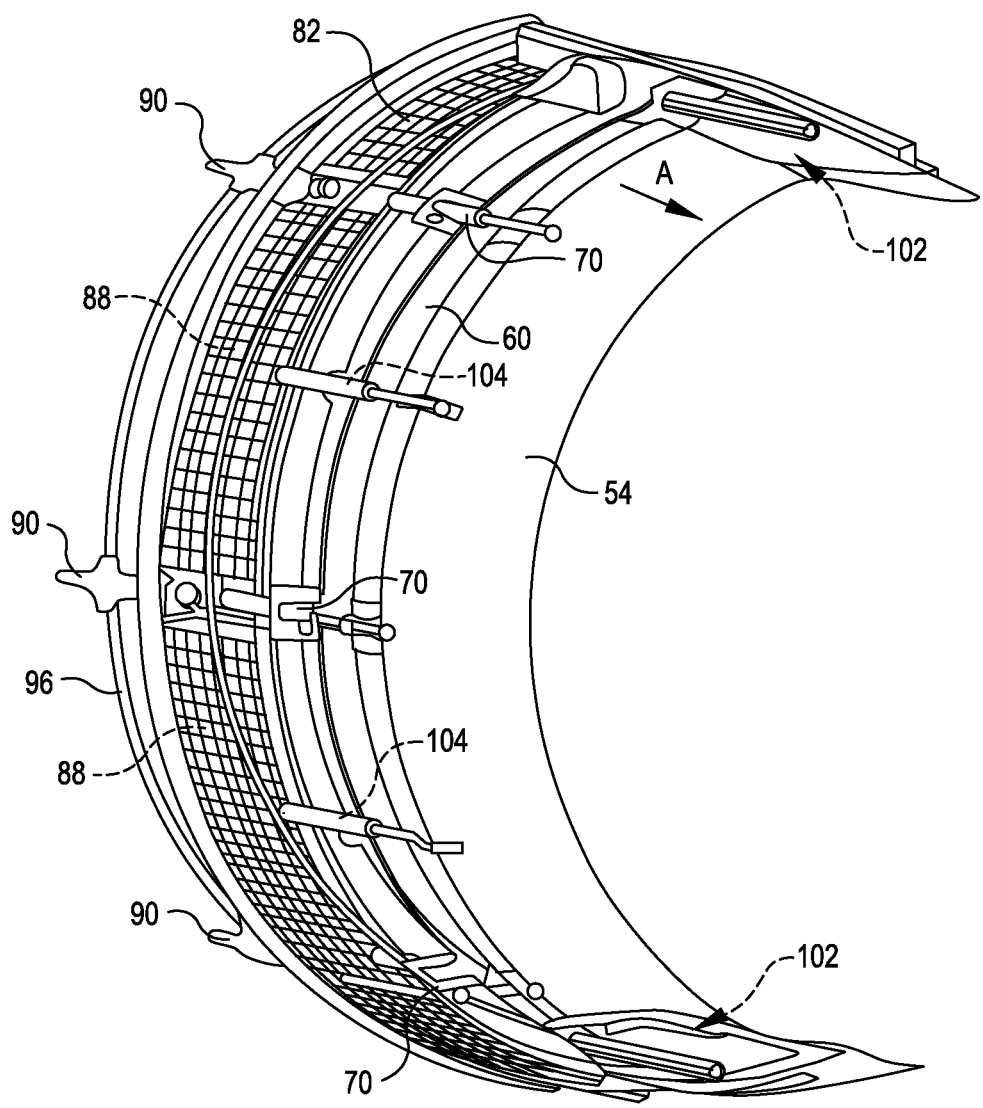
FIG. 4 is a perspective view that shows a portion of the VAFN assembly of the turbofan engine of FIG. 1.
Figure 5:
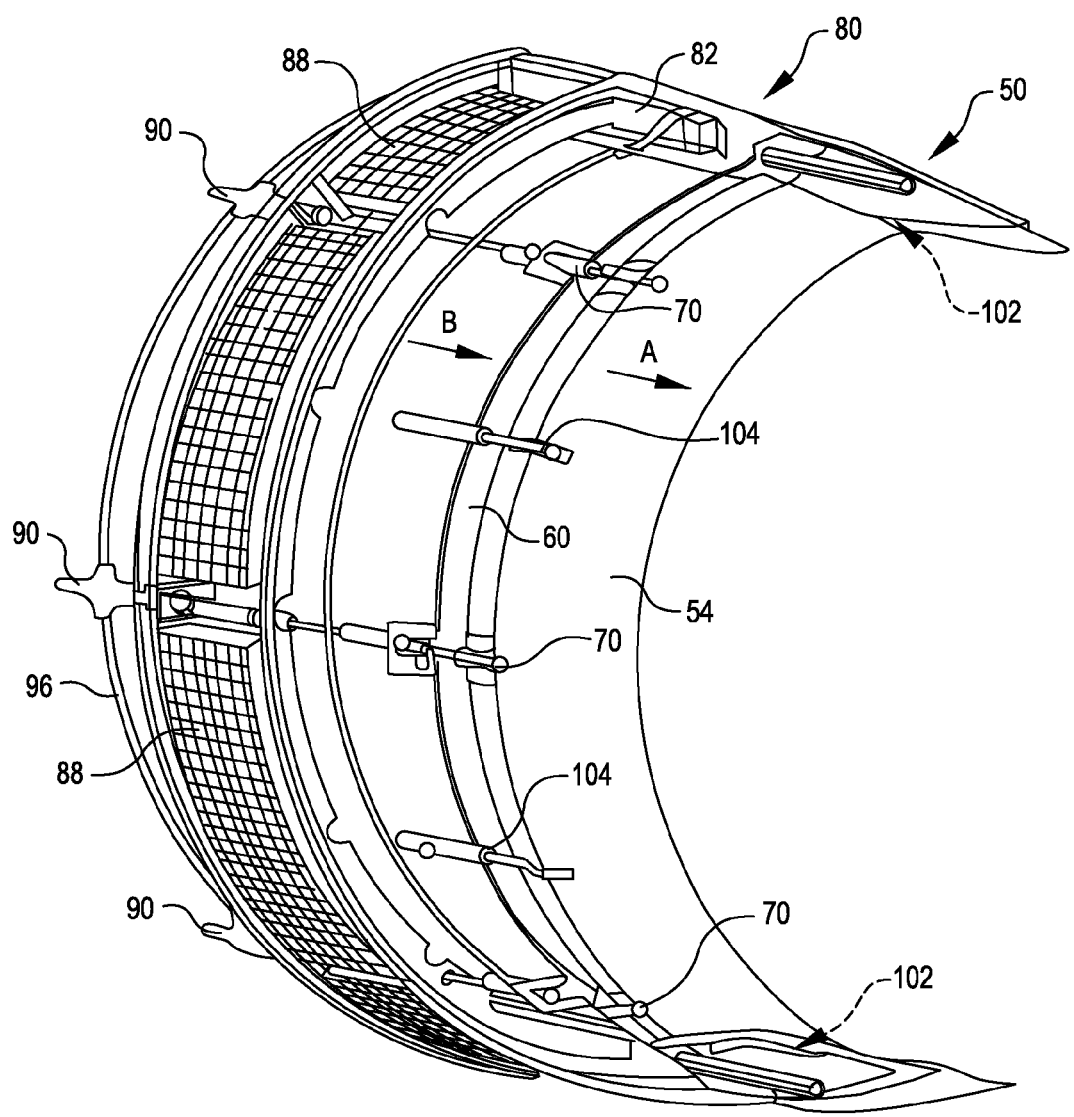
FIG. 5 is another perspective view that shows a portion of the VAFN assembly of the turbofan engine of FIG. 1.

The translating fan nozzle 50 and surrounding structure are described below with reference to FIG. 4 and FIG. 5. In FIG. 4 and FIG. 5, elements that are obscured or partially obscured due to intervening elements are indicated by dashed lead lines.

FIG. 4 is a partial view of the mounting structure for a first ring section 54 of the translating fan nozzle 50 and the corresponding, adjacent first sleeve section 82 of the thrust reverser 80. The second ring section 56 of the translating fan nozzle 50 and the second sleeve section 84 of the thrust reverser 80, which are shown in FIG. 1 and FIG. 3, can be mounted in a similar manner. In FIG. 4, the thrust reverser 80 is in a stowed position, covering the cascade vanes 88. The translating fan nozzle 50 is in an open or deployed position so that an upstream exit 60 is defined between the first ring section 54 and the first sleeve section 84. The rearward axial translation of the first ring section 54 to the deployed position is indicated by the arrow A. The ring actuators 70 can extend from the sleeve section 82, across the upstream exit 60, and connect to a fore end of the ring section 54. The guide tubes 104 can also extend from the sleeve section 82, across the upstream exit 60, and connect to the fore end of the ring section 54. A sleeve actuation cable 96 can connect to each sleeve actuator 90 to provide simultaneous actuation of each actuator 90.

FIG. 5 shows the thrust reverser 80 in a deployed position and the translating fan nozzle 50 in the open position. The rearward axial translation of the first sleeve section 82 from the position shown in FIG. 4 to the deployed position is indicated by the arrow B. Rearward translation of the sleeve section 82 exposes the cascade vanes 88 during operation of the thrust reverser 80. The ring section 54 can also be translated aft during operation of the thrust reverser 80, as shown in this embodiment. Translation of the ring section 54 at the same time that the thrust reverser 80 is deployed, may be optional because the bypass flow is rerouted through the cascade vanes 88.

VAFN Seal Assembly

Figure 6:
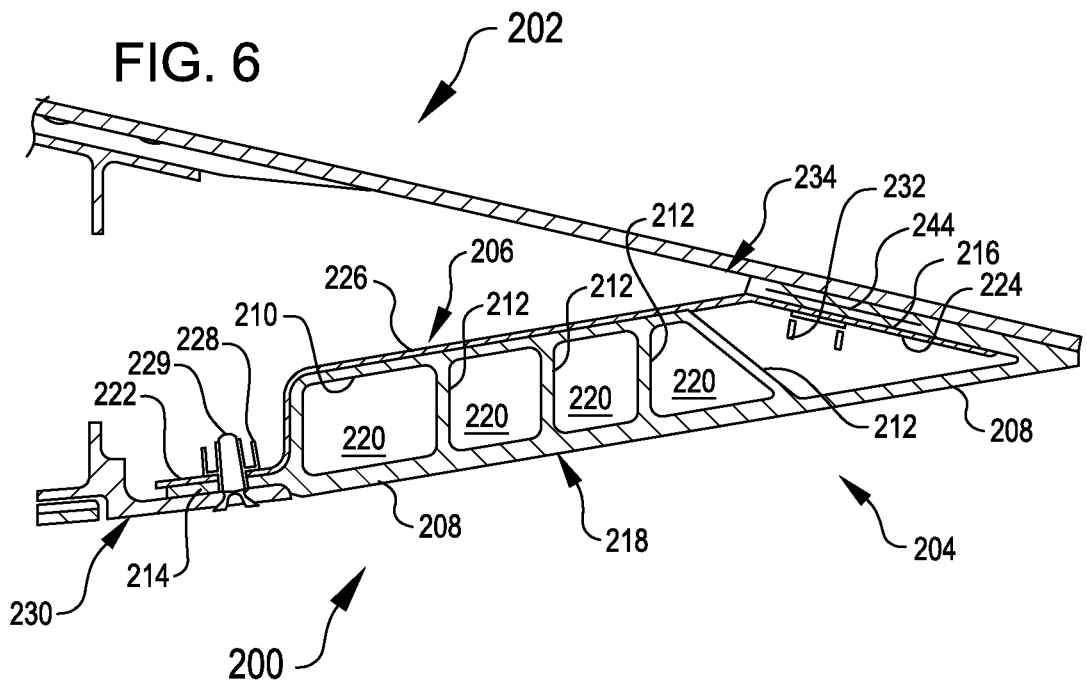
FIG. 6 is a cross-sectional view showing a VAFN seal assembly attached to a nacelle forward assembly, in accordance with many embodiments.

FIG. 6 shows a cross section of a VAFN seal assembly 200 attached to a nacelle assembly 202, in accordance with many embodiments. The VAFN seal assembly 200 includes a main seal 204 and a main seal retainer 206. The main seal 204 includes an inner wall 208, an outer wall 210, four webs 212, a main seal forward flange 214, and a main seal aft flange 216, all of which extend circumferentially at least partially around the bypass duct, for example, for at least 90 degrees around the bypass duct. The inner wall 208 defines an exposed inner surface 218 that provides a substantially smooth aerodynamic boundary for bypass airflow exited through the bypass flow exit when the VAFN is in the deployed position. The inner wall 208, webs 212, and the outer wall 210 define four enclosed cell areas 220. The outer wall 210 is secured and/or attached to the main seal retainer 206, for example, by adhesive bonding.

The main seal retainer 206 includes a retainer forward flange 222, a retainer aft flange 224, and a retainer middle portion 226 extending between the retainer forward flange 222 and the retainer aft flange 224. A circumferentially extending row of nut plates 228 is attached to the retainer forward flange 222 for receiving a corresponding row of removable fasteners 229 used to attach the forward end of the VAFN seal assembly 200 to a flange 230 of the nacelle assembly 202. And a circumferentially extending row of nut plates 232 is attached to the retainer aft flange 224 for receiving a corresponding row of removable fasteners (not shown) used to attach the aft end of the VAFN seal assembly 200 to an outer panel 234 of the nacelle assembly 202. The seal forward flange 214 is clamped between the retainer forward flange 222 and the nacelle assembly flange 230. The seal aft flange 216 is also clamped between the nacelle assembly outer panel 234 and the retainer aft flange 224. The combination of the seal retainer 206 and the nacelle assembly outer panel 234 provides support structure for the main seal 204 that accurately positions the main seal 204 and reacts loads from the main seal 204 into the nacelle assembly 202. The seal retainer 206 is configured to provide a seal receiving cavity that accommodates the main seal 204. And the circumferential attachment of the seal retainer 206 to the nacelle assembly 202 provides a combined structure that accurately positions the seal receiving cavity relative to the VAFN.

In the embodiment shown, each of the webs 212 has a constant thickness planar configuration. While constant thickness planar webs 212 are shown, any suitable alternate web configuration can be used. For example, webs having varying thickness and/or non-planar webs can be used.

Figure 7:
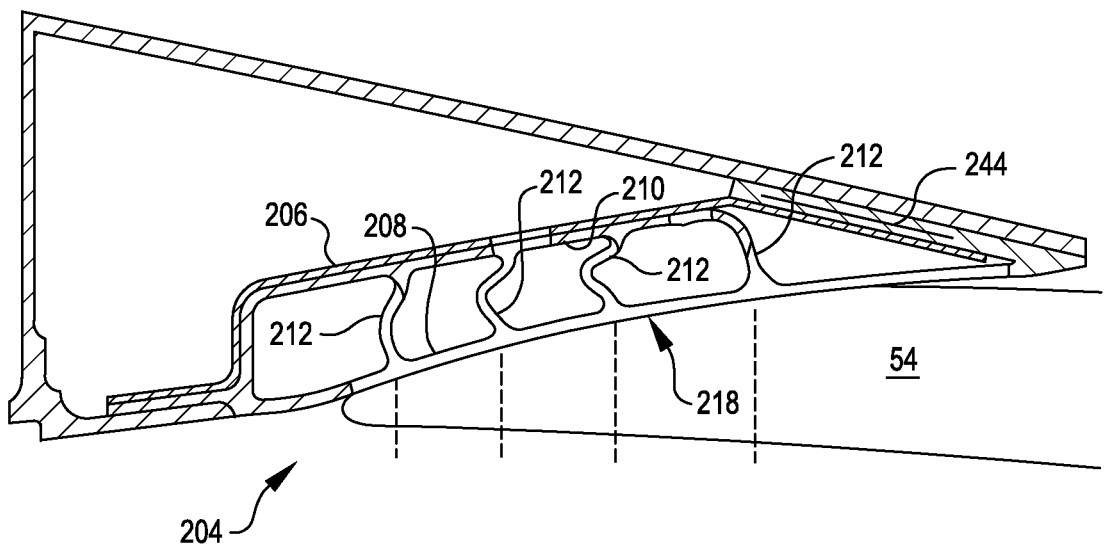
FIG. 7 is a cross-sectional view that shows a VAFN main seal being compressed between a VAFN and a VAFN main seal retainer, in accordance with many embodiments.

FIG. 7 shows a cross section of the main seal 204 being compressed between a stowed position VAFN ring section 54 and the main seal retainer 206. In the stowed position, the relatively stiff VAFN ring section 54 deflects the inner surface 218 toward the outer wall 210, thereby deforming the inner wall 208 and significantly deforming the four webs 212 such that each of the webs 212 is resiliently deformed into a non-planar configuration, thereby creating 'lines of sealing' between the main seal 204 and the VAFN ring section 54. Although each of the webs 212 is resiliently deformed into a non-planar configuration in the embodiment described, other embodiments having one or more webs that are not deformed into a non-planar configuration are possible. In the embodiment shown, the webs 212 are not aligned in the same direction the inner wall 208 is deflected, thereby producing eccentric loading on the webs 212. Such eccentric loading reduces the force required to drive the webs 212 into the post-buckled non-planar configuration shown. In many embodiments, the main seal 204 is primarily formed from a reinforced elastomeric material with suitable resiliency so that the main seal 204 is not permanently deformed as a result of the deformation imposed by the stowed VAFN ring section 54.

The main seal 204 can be fabricated from a suitable material. For example, the main seal 204 can be fabricated from Silicon Rubber per Aerospace Materials Specification (AMS) 3346 with polyester fabric on the surface.

Figure 8:
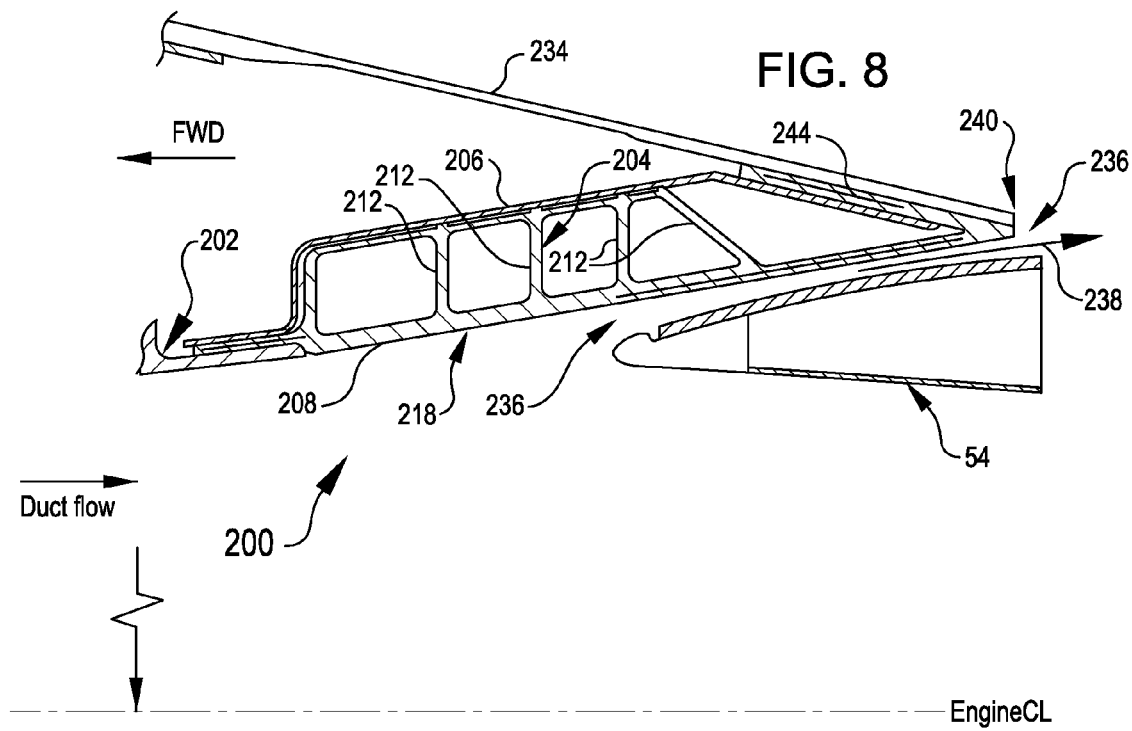
FIG. 8 is a cross-sectional view that shows the VAFN seal assembly of FIG. 6 when the VAFN is in a deployed position, in accordance with many embodiments.

FIG. 8 shows the nacelle assembly 202 and the VAFN seal assembly 200 relative to the VAFN ring section 54 in a deployed position. When the VAFN ring section 54 is in a deployed position, a bypass flow exit 236 is formed between the combination of the nacelle assembly 202 and the VAFN seal assembly 200 and the VAFN ring section 54. As shown, the inner surface 218 of the main seal 204 provides an aerodynamic boundary for an airflow 238 that exits through the bypass flow exit 236.

When the VAFN ring section 54 is in a deployed position, the main seal 204 is subjected to applied pressure loading. The main seal 204 is designed to react the applied pressure loading without experiencing deflections that would produce excessive levels of aerodynamic drag. For example, the planar webs 212 support the inner wall 208 at multiple locations along the inner wall 208, thereby helping to maintain the position and the shape of the inner wall 208. The combined structure provided by the nacelle assembly outer panel 234 and the main seal retainer 206 provides a hard trailing edge 240, which experiences little or no significant levels of deflection relative to adjacent forward portions of the nacelle assembly 202. And the combined structure provided by the nacelle assembly outer panel 234 and the main seal retainer 206 accurately supports the main seal 204 and reacts loads from the main seal 204 without experiencing significant levels of deflection relative to adjacent forward portions of the nacelle assembly 202.

Figure 9:
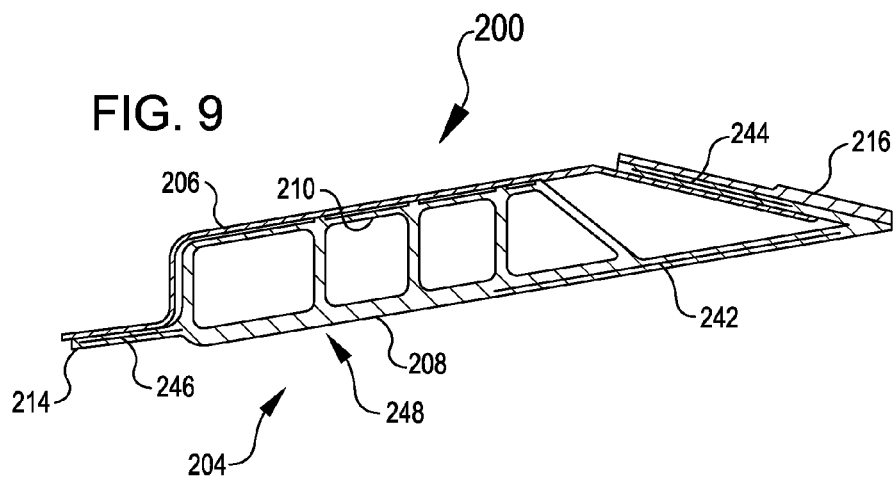
FIG. 9 is a cross-sectional view illustrating details of the VAFN seal assembly of FIG. 6, in accordance with many embodiments.

FIG. 9 shows additional details of the VAFN seal assembly 200. The main seal 204 includes an embedded surface reinforcement 242 that stiffens at least an aft portion of the inner wall 208, an embedded aft attach reinforcement 244 that reinforces the main seal aft flange 216, and an embedded forward attach reinforcement 246 that reinforces the main seal forward flange 214. The embedded surface reinforcement 242 can be made from any suitable rigid material, for example, a cured composite laminate such as a fiberglass laminate. The embedded surface reinforcement 242 can be configured to stiffen the inner wall in the fore and aft direction and can include features (e.g., circumferentially distributed reduced cross-sectional areas) that reduce the amount of stiffness added to the main seal 204 in the circumferential direction so as to reduce the amount of additional circumferential hoop loading associated with circumferential deflection of the embedded surface reinforcement 242 that results from radial deflection of the inner wall 208 when the VAFN ring section 54 is in the stowed position. The aft attach reinforcement 244 and the forward attach reinforcement 246 can be made from a suitable material, for example, a sheet of corrosion resistant steel of suitable thickness. The main seal retainer 206 can be made from a suitable material (e.g., sheet metal, a composite laminate). For example, the main seal retainer 206 can be made from a graphite epoxy laminate. The main seal 204 can include a "no strike-through" surface fabric 248 on the seal inner wall 208 for durability and low friction between the VAFN ring section 54 and the inner wall 208. The main seal 204 can be bonded and/or mechanically retained to the main seal retainer 206 along the outer wall 210. Alternatively, a durable and low friction material may be used as the main seal 204 or be integrally fabricated into the main seal 204.

Figure 10:
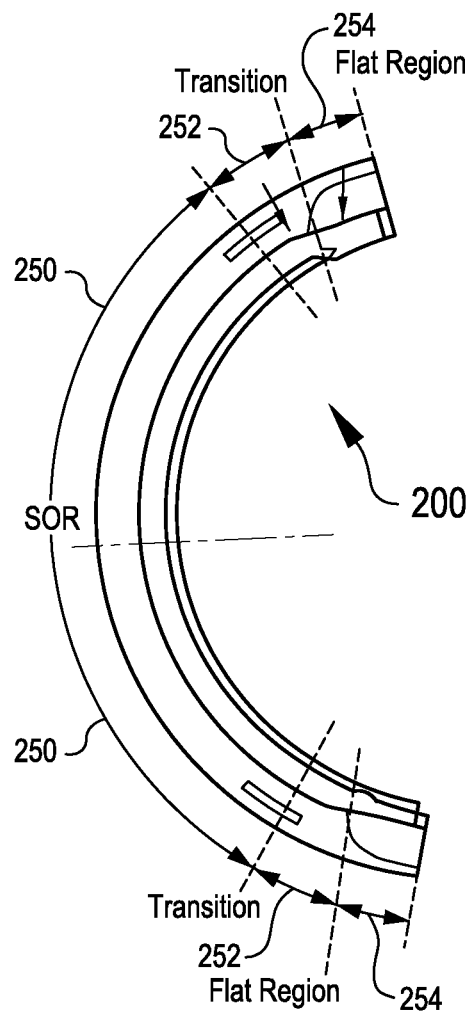
FIG. 10 is a rear-view of a VAFN seal assembly attached to a nacelle assembly that illustrates a surface of revolution (SOR) region, transition regions, and flat regions of the VAFN seal assembly, in accordance with many embodiments.
Figure 11:
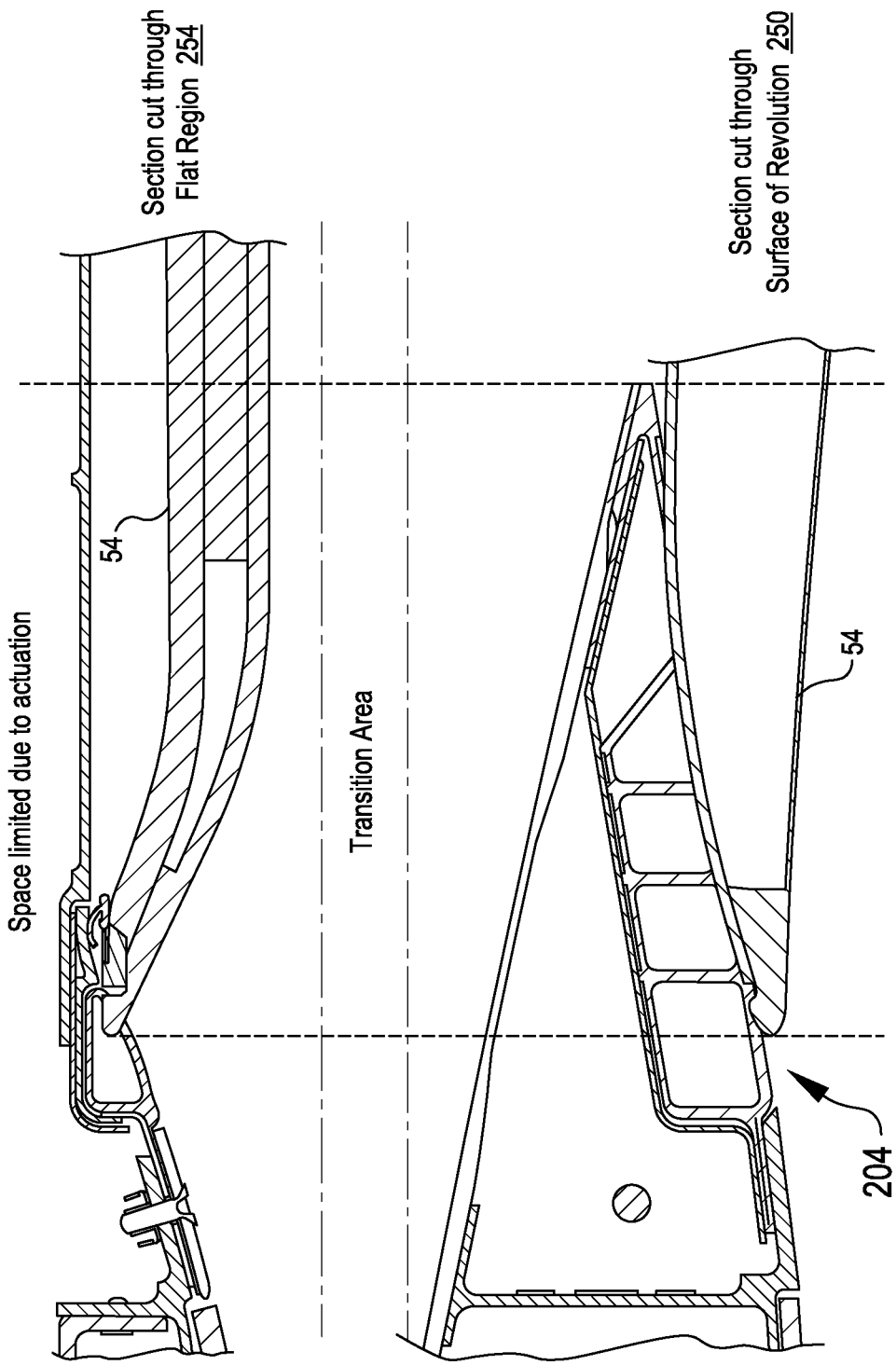
FIG. 11 includes cross-sectional views of a VAFN in a stowed position interfacing with the VAFN seal assembly in one of the flat regions and in the surface of revolution (SOR) region, in accordance with many embodiments.

FIG. 10 is a rear-view of the VAFN seal assembly 200 attached to the nacelle assembly 202. The VAFN seal assembly 200 includes a surface of revolution (SOR) region 250, transition regions 252, and flat regions 254. Throughout the SOR region 250, the main seal 204 has a constant cross section (as shown in FIG. 9) and is axially symmetric relative to the engine centerline. In the transition regions, the depth of the main seal 204 is reduced from the full cross section of the SOR region 250 down to just the inner wall 208 near the start of the corresponding flat region 254. For example, the main seal 204 can be initially formed with the full cross section of the SOR region 250 extended through the transition regions 252 and then the portions of the main seal 204 and the webs 212 in the transition regions 252 can be tapered in height until only the inner wall 208 remains. FIG. 11 includes cross-sectional views of the VAFN ring section 54 in the stowed position interfacing with the VAFN seal assembly 200 in one of the flat regions 254 and in the surface of revolution (SOR) region 250 (deflection of the main seal 204 not depicted).

Figure 12:
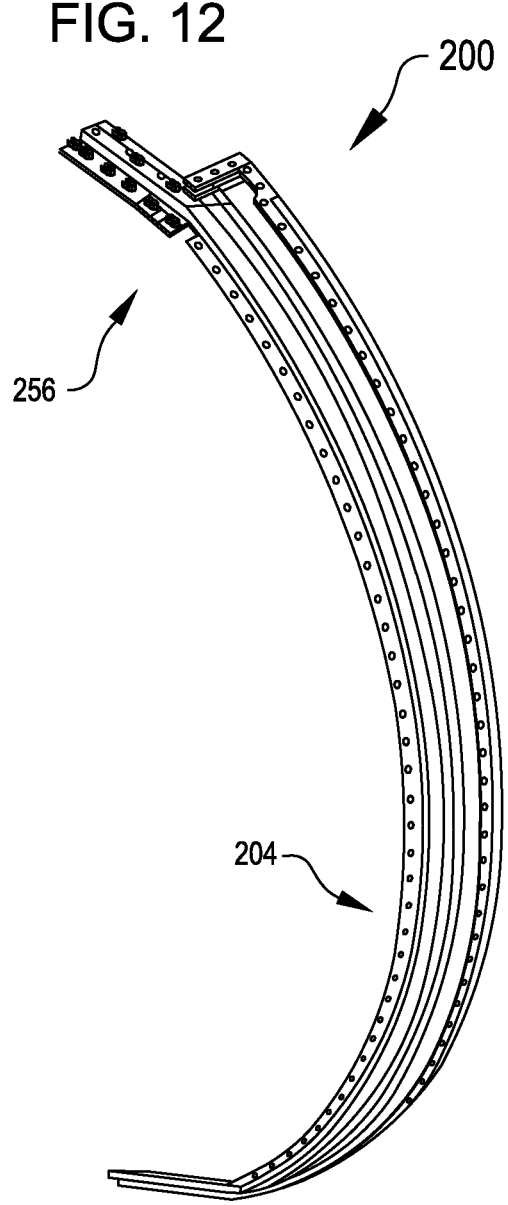
FIG. 12 is a perspective view showing the VAFN seal assembly of FIG. 10.

FIG. 12 is a perspective view showing the VAFN seal assembly 200 detached from the nacelle assembly 202. The seal assembly includes the main seal 204 that spans the SOR region 250 and the transition regions 252, and optionally, a bulb seal 256 at each end flat region 254; bulb seals can be used if the aerodynamic loft lines are such that the main seal 204 is unable to provide, by itself, adequate sealing in these areas.

Figure 13A:
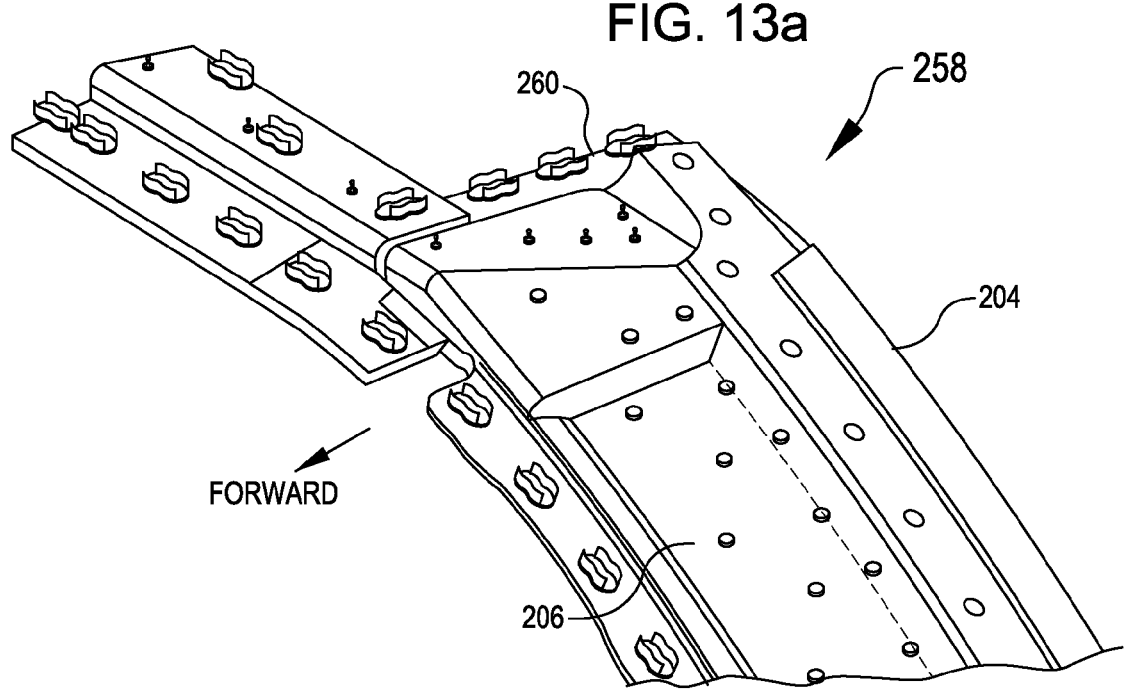
FIGS. 13a and 13b are perspective views showing one of the transition regions and one of the flat regions of the VAFN seal assembly of FIG. 10.
Figure 13B:
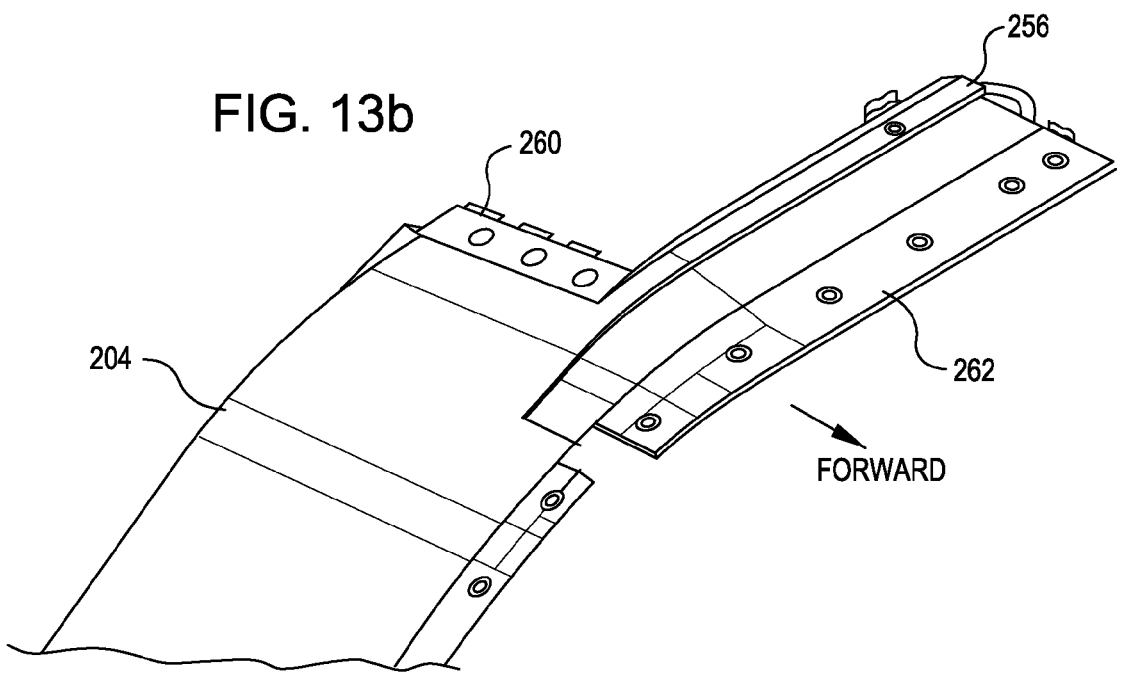

FIGS. 13a and 13b are perspective views showing one of the transition regions and one of the flat regions of the VAFN seal assembly 200. A transition region portion 258 of the main seal retainer 206 is shaped to interface with the trimmed shape of the main seal 204 in the transition region 252. A hoop retainer 260 is used at each end of the main seal 204 and a bulb seal retainer 262 is used to retain each of the bulb seals 256.

Figure 14:
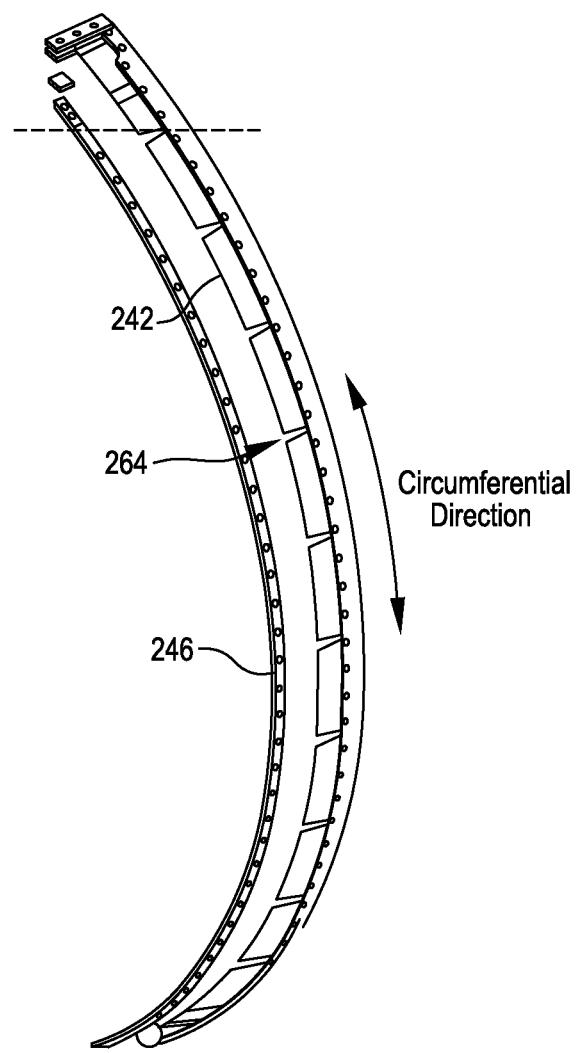
FIG. 14 is a perspective view illustrating internal reinforcement layers of the VAFN seal assembly of FIG. 12.

FIG. 14 is a perspective view illustrating the internal reinforcement layers of the main seal 204 with the elastomeric body of the main seal 204 not shown for clarity. As illustrated, the embedded surface reinforcement 242 extends circumferentially and has circumferentially-spaced reduced-stiffness sections 264 (e.g., trim-outs, locations between discrete disconnected sections), which serve to reduced the stiffness in the circumferential direction that is added to the main seal 204 by the embedded surface reinforcement 242. In contrast, each of the aft attach reinforcement 244 and the forward attach reinforcement 246 has a constant cross section in the circumferential direction. The aft attach reinforcement 244 and the forward attach reinforcement 246 are not subjected to any significant radial deflection when the VAFN ring section 54 is in the stowed position (as illustrated in FIG. 7). Accordingly, circumferential hoop loads are not significantly impacted by the circumferential stiffness added by the aft and forward attach reinforcements 244, 246.

Figure 15:
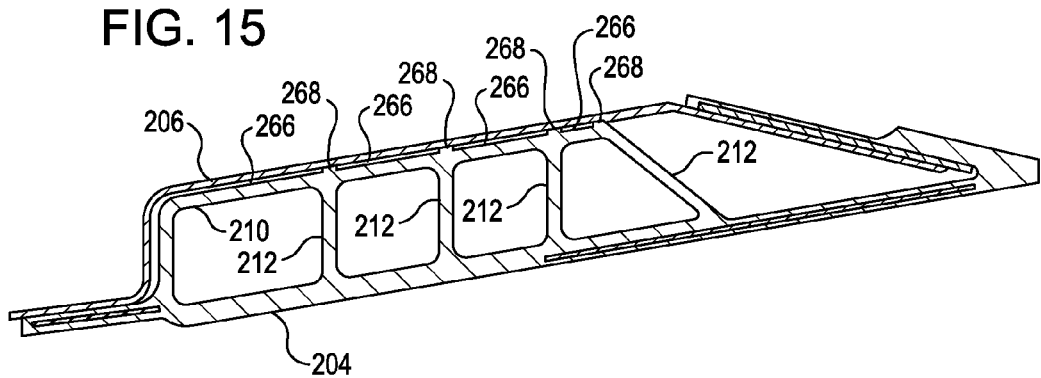
FIG. 15 is a cross-sectional view of the VAFN main seal illustrating adhesive accommodating recesses and associated adjacent non-recessed regions, in accordance with many embodiments.

FIG. 15 is a cross-sectional view illustrating adhesive accommodating recesses 266 in the main seal 204 and associated adjacent non-recessed regions 268. The recesses 266 extend circumferentially along the circumferential length of the main seal 204 and accommodate adhesive used to bond the outer wall 210 to the main seal retainer 206. The recesses 266 are disposed between and adjacent to the non-recessed regions 268, which are aligned with the webs 212. As shown, the non-recessed regions 268 interface with the main seal retainer 206, thereby accurately positioning the main seal 204 relative to the main seal retainer 206.

Figure 16A:
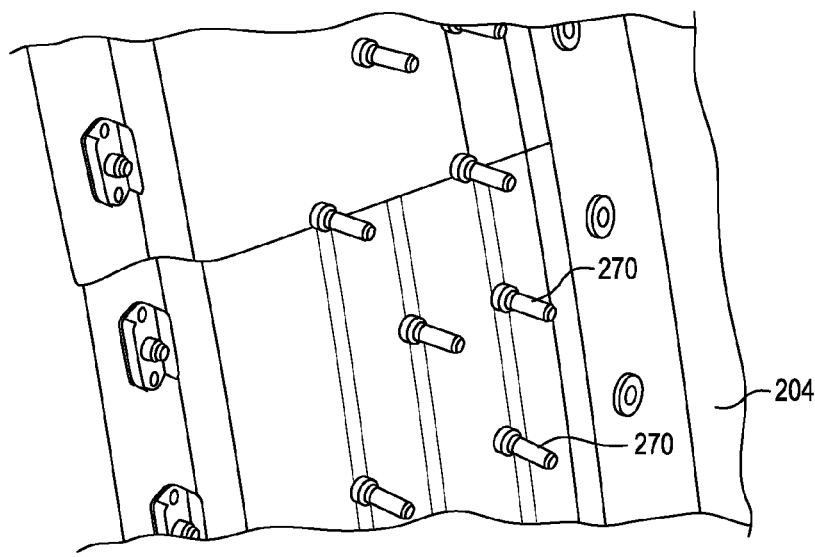
FIGS. 16a and 16b are perspective views illustrating elongate pull-through features of the VAFN main seal that interface with holes in the seal retainer to accurately position the main seal relative to the seal retainer during bonding of the main seal to the seal retainer, in accordance with many embodiments.
Figure 16B:
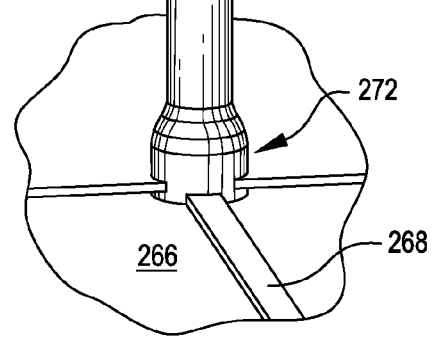

FIGS. 16a and 16b are perspective views illustrating elongate pull-through features 270 of the main seal 204. The pull-through features 270 interface with holes in the main seal retainer 206 (partially removed to enhance clarity) to accurately position the main seal 204 relative to the main seal retainer 206 during bonding of the main seal 204 to the main seal retainer 206. The pull-through features 270 are integrally formed parts of the main seal 204. The pull-through features 270 include a lower cylindrical portion 272 and an upper cylindrical portion 274. Each of the lower cylindrical portions 272 has a diameter selected to be suitably larger than a diameter of the corresponding hole in the main seal retainer 206 so that a suitable amount of interference fit is generated between the lower cylindrical portion 272 and the hole when installed. Each of the upper cylindrical portions 274 has a diameter that is smaller than the diameter of the corresponding hole in the main seal retainer 206 so that the upper cylindrical portion 274 can be freely inserted into the corresponding hole during the installation process. Following insertion of the upper cylindrical portions 274 into the holes of the main seal retainer 206, each of the pull-through features 270 is pulled relative to the main seal retainer 206 to pull the lower cylindrical portion 272 through the hole. When the pull-through feature 270 is pulled, the diameter of the lower cylindrical portion 272 reduces temporarily in response to the axial strain imposed on the lower cylindrical portion 272, thereby allowing the lower cylindrical portion 272 to be pulled partially through the corresponding hole. Upon release of the pull-through feature 270, the lower cylindrical portion 272 expands back to the original diameter, thereby engaging the hole and serving to retain the main seal 204 relative to the main seal retainer 206. The pull-through features 270 are distributed along the main seal 204. Many of the pull-through features 270 are aligned with the non-recessed areas 268, thereby providing multiple locations along the main seal 204 where the pull-through features 270 serve to ensure contact between the non-recessed areas 268 and the main seal retainer 206 so as to accurately position the main seal 204 relative to the main seal retainer 206 during the bonding of the main seal 204 to the main seal retainer 206. The protruding portions of the pull-through features 270 can be cut off after installation to reduce weight.

FIG. 17 is a cross-sectional view illustrating the location of vent ports 276, 278, 280 in the VAFN main seal 204, in accordance with many embodiments. The inner wall 208 includes a first vent port 276 that places a first enclosed cell area 282 of the main seal 204 in communication with the bypass duct. Web vent ports 278 place the first enclosed cell area 282 in communication with a second enclosed cell area 284, a third enclosed cell area 286, and a fourth enclosed cell area 288. Accordingly, on account of the first vent port 276 and the web vent ports 278, the pressure differential across the inner wall 208 in the forward portion of the main seal 204 is reduced, which serves to reduce associated deflections of the inner wall 208. Instead, the pressure differential is transferred to the outer wall 210, which directly transfers the associated loads to the main seal retainer 206. An exterior vent port 280 vents an aft cavity 290 through the nacelle assembly outer panel 234.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A nacelle for a turbofan engine having an engine centerline, the nacelle comprising:
   a forward assembly that defines a bypass duct extending circumferentially at least partially around the engine centerline, the bypass duct being configured to transport bypass airflow of the engine, the forward assembly having an aft edge that extends circumferentially at least partially around the bypass duct;
   a variable area fan nozzle (VAFN) disposed behind the forward assembly and movable relative to the forward assembly between a stowed position and a deployed position, an upstream bypass flow exit for the bypass duct being defined between the forward assembly and the VAFN when the VAFN is in the deployed position, an outer surface of the VAFN providing an aerodynamic boundary for bypass airflow exited through the bypass flow exit; and
   a seal attached to the forward assembly, the seal including an inner wall and a plurality of webs attached to the inner wall and extending transversely there-from, each of the webs extending circumferentially at least partially around the bypass duct, the inner wall defining an exposed inner surface that extends circumferentially at least partially around the bypass duct, the inner surface providing a substantially smooth aerodynamic boundary for bypass airflow exited through the bypass flow exit when the VAFN is in the deployed position, at least a portion of the inner surface interfacing with the VAFN outer surface when the VAFN is in the stowed position, at least one of the plurality of webs deformable into a non-planar configuration when the VAFN is in the stowed position.

2. The nacelle of claim 1, wherein the seal extends circumferentially around the engine centerline for at least 90 degrees.

3. The nacelle of claim 2, wherein a height of the seal is tapered down near an end of the seal.

4. The nacelle of claim 3, further comprising a bulb seal attached to the forward assembly and disposed at the end of the seal, the bulb seal being compressed between the forward assembly and the VAFN when the VAFN is in the stowed position.

5. The nacelle of claim 1, wherein each of the webs has a planar configuration when the VAFN is in the deployed position.

6. The nacelle of claim 1, wherein the seal includes an elastomeric material.

7. The nacelle of claim 1, wherein the elastomeric material includes silicon rubber.

8. The nacelle of claim 1, further comprising a seal retainer defining a seal receiving cavity for the seal; the seal receiving cavity having an arcuate shape extending circumferentially at least partially around the bypass duct; the seal retainer includes a retainer forward flange, a retainer aft flange, and a retainer middle portion extending between the retainer forward and aft flanges; each of the retainer forward and aft flanges extending circumferentially at least partially around the bypass duct and being attached to the forward assembly; the seal located between the VAFN and the retainer middle portion when the VAFN is in the stowed position.

9. The nacelle of claim 8, wherein the seal includes a seal forward flange that extends circumferentially at least partially around the bypass duct and a seal aft flange that extends circumferentially at least partially around the bypass duct, the seal forward flange being disposed between the retainer forward flange and the forward assembly, the seal aft flange being disposed between the retainer aft flange and the forward assembly.

10. The nacelle of claim 9, wherein at least one of the seal forward flange or the seal aft flange includes an embedded reinforcement layer.

11. The nacelle of claim 10, wherein:
   the seal forward flange includes an embedded reinforcement layer;
   the seal aft flange includes an embedded reinforcement layer; and
   the inner wall includes an embedded reinforcement layer.

12. The nacelle of claim 11, wherein the inner wall reinforcement layer has a plurality of reduced-stiffness sections distributed circumferentially at least partially around the engine centerline to reduce stiffness of the inner wall reinforcement layer circumferential to the engine centerline.

13. The nacelle of claim 8, wherein the seal includes an outer wall offset from the inner wall and attached to the webs, a plurality of enclosed cell areas being defined within the seal and extending circumferentially at least partially around the bypass duct, the outer wall being attached to the retainer middle portion.

14. The nacelle of claim 13, wherein:
   the inner wall includes a vent port in communication with a first enclosed cell area of the enclosed cell areas; and
   one of the webs includes a vent port in communication with the first enclosed cell area and a second enclosed cell area of the enclosed cell areas, the first and second enclosed cell areas being different.

15. The nacelle of claim 13, wherein the outer wall is bonded to the retainer middle portion.

16. The nacelle of claim 15, wherein the outer wall includes a plurality of recesses extending circumferentially at least partially around the bypass duct, the recesses accommodating adhesive used to bond the outer wall to the retainer, the recesses being disposed between non-recessed areas substantially aligned with the webs, the non-recessed areas substantially interfacing with the retainer middle portion.

17. The nacelle of claim 16, wherein the seal includes a plurality of elongate pull-through features extending from the outer wall through holes in the retainer middle portion, the pull-through features interfacing with the holes in the retainer middle portion to position the outer wall relative to the retainer middle portion.

18. The nacelle of claim 1, wherein the inner wall includes an embedded reinforcement layer.

19. The nacelle of claim 18, wherein the inner wall reinforcement layer has a plurality of reduced-stiffness sections distributed circumferentially at least partially around the engine centerline to reduce stiffness of the reinforcement layer circumferential to the engine centerline.

20. A seal assembly for a turbofan engine, the engine including a forward assembly and a VAFN disposed behind the forward assembly and movable relative to the forward assembly between a stowed position and a deployed position, the forward assembly defining a bypass duct extending circumferentially at least partially around the engine centerline, the bypass duct being configured to transport bypass airflow of the engine, the forward assembly having an aft edge that extends circumferentially at least partially around the bypass duct, an upstream bypass flow exit for the bypass duct being defined between the forward assembly and the VAFN when the VAFN is in the deployed position, an outer surface of the VAFN providing an aerodynamic boundary for bypass airflow exited through the bypass flow exit, the seal assembly including:

a seal including an inner wall and a plurality of webs attached to the inner wall and extending transversely there-from, each of at least two of the webs configured to extend circumferentially at least partially around the bypass duct, the inner wall defining an exposed inner surface configured to extend circumferentially at least partially around the bypass duct, the inner surface configured to provide a substantially smooth aerodynamic boundary for bypass airflow exited through the bypass flow exit when the VAFN is in the deployed position, at least a portion of the inner surface configured to interface with the VAFN outer surface when the VAFN is in the stowed position so as to seal the bypass flow exit, each of at least two of the webs being configured to deform into a non-planar configuration when the VAFN is in the stowed position; and a seal retainer attached to the seal and defining a seal receiving cavity for the seal; the seal receiving cavity having an arcuate shape configured to extend circumferentially at least partially around the bypass duct; the seal retainer includes a retainer forward flange, a retainer aft flange, and a retainer middle portion extending between the retainer forward and aft flanges; each of the retainer forward and aft flanges configured to extend circumferentially at least partially around the bypass duct and be attached to the forward assembly; the seal being configured to be compressed between the VAFN and the retainer middle portion when the VAFN is in the stowed position.

* * * * *